(12) United States Patent
Wingerath (10) Patent No.: US 11,073,239 B2
(45) Date of Patent: Jul. 27, 2021

(54) THERMOSTATIC STEAM TRAP

(71) Applicant: VELAN INC., Montreal (CA)

(72) Inventor: Christian Matthias Wingerath, Dusseldorf (DE)

(73) Assignee: Velan Inc., Montreal (CA)

( * ) Notice: Subject to any disclaimer, the term of this patent is extended or adjusted under 35 U.S.C. 154(b) by 173 days.

(21) Appl. No.: 15/420,095

(22) Filed: Jan. 31, 2017

(65) Prior Publication Data

US 2018/0149311 A1    May 31, 2018

Related U.S. Application Data

(60) Provisional application No. 62/427,718, filed on Nov. 29, 2016.

(51) Int. Cl.
| | | |
|---|---|---|
| *F16T 1/08* | (2006.01) | |
| *F16T 1/02* | (2006.01) | |
| *G05D 23/00* | (2006.01) | |

(52) U.S. Cl.
CPC . *F16T 1/08* (2013.01); *F16T 1/02* (2013.01); *G05D 23/00* (2013.01)

(58) Field of Classification Search
CPC .............. G05D 23/00; F16T 1/08; F16T 1/00
USPC ....................................................... 236/48 R
See application file for complete search history.

(56) References Cited

U.S. PATENT DOCUMENTS

| | | | | |
|---|---|---|---|---|
| 1,988,149 A | * | 1/1935 | Armstrong ............. | G05D 23/00 337/308 |
| 2,346,259 A | * | 4/1944 | Hutchings ............. | D06F 39/045 137/387 |
| 2,793,814 A | * | 2/1955 | Velan ........................ | F16T 1/08 236/59 |
| 2,803,408 A | * | 7/1955 | Hope ..................... | G05D 23/01 236/12.4 |
| 3,169,704 A | * | 2/1965 | Domm ..................... | F16T 1/08 236/59 |

(Continued)

FOREIGN PATENT DOCUMENTS

| | | |
|---|---|---|
| FR | 2256694 | 7/1975 |
| FR | 2911383 | 7/2008 |

(Continued)

OTHER PUBLICATIONS

"Cantilever, n." OED Online, Oxford University Press, Jun. 2020, www.oed.com/view/Entry/27259. Accessed Aug. 3, 2020. (Year: 2020).*

(Continued)

*Primary Examiner* — Edward F Landrum
*Assistant Examiner* — Alexis K Cox
(74) *Attorney, Agent, or Firm* — Mathieu Audet (57) ABSTRACT

A thermostatic steam trap includes a lower casing; an upper casing secured with the lower casing; and a mechanism that is operatively secured with the lower casing and the upper casing and that includes a stack of bimetallic strips. The stack of bimetallic strips includes two opposed cantilevered portions separated by a neutral flexion axis thereof. A stem member slidably extends through the stack of bimetallic strips and the lower casing, and a valve portion includes a valve member that is operatively secured to a first end of the stem member and that selectively closes the valve portion with movement of the cantilevered portions of the stack of bimetallic strips.

20 Claims, 7 Drawing Sheets

(56) References Cited

U.S. PATENT DOCUMENTS

| | | | | |
|---|---|---|---|---|
| 3,353,746 A * | 11/1967 | Foller | ............... | F16T 1/08 |
| | | | | 236/59 |
| 3,362,636 A * | 1/1968 | Sentaro Miyawaki | ... | F16T 1/08 |
| | | | | 236/59 |
| 3,639,798 A * | 2/1972 | Miller | ............... | H01J 29/073 |
| | | | | 313/405 |
| 3,702,589 A * | 11/1972 | Erbert | ............... | F42C 15/36 |
| | | | | 102/272 |
| 3,799,432 A * | 3/1974 | Schneider | ............... | G05D 23/08 |
| | | | | 236/48 R |
| 3,831,396 A * | 8/1974 | Donaldson | ............... | G21C 15/02 |
| | | | | 62/467 |
| 4,016,901 A * | 4/1977 | Kenny | ............... | G05D 23/023 |
| | | | | 137/340 |
| 4,427,149 A * | 1/1984 | Adachi | ............... | F16T 1/08 |
| | | | | 236/101 B |
| 4,430,808 A * | 2/1984 | Toyomi | ............... | A45D 20/50 |
| | | | | 132/116 |
| 4,561,588 A * | 12/1985 | Foller | ............... | F16T 1/08 |
| | | | | 236/59 |
| 2011/0013330 A1 * | 1/2011 | Crevenat | ............... | H01H 83/10 |
| | | | | 361/115 |
| 2011/0293798 A1 * | 12/2011 | Radhakrishnan et al. | ............... | |
| | | | | A47J 31/44 |
| | | | | 426/231 |

FOREIGN PATENT DOCUMENTS

| | | |
|---|---|---|
| GB | 2067741 | 7/1981 |
| GB | 2117108 | 10/1983 |

OTHER PUBLICATIONS

"Cantilevered, adj." OED Online, Oxford University Press, Jun. 2020, www.oed.com/view/Entry/27260. Accessed Aug. 3, 2020. (Year: 2020).*

European Search Report, published Sep. 21, 2017, by the European Patent Office (Munich), Author: Georges Zerf in European patent application 17153790.5-1610.

* cited by examiner

THERMOSTATIC STEAM TRAP

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to apparatus, methods, and systems for extracting condensate from a pressurized system. More particularly, preferred embodiments of the present invention relate to a reduced-size symmetrical steam trap that can trap steam and release condensate depending on pressure and temperature.

Steam traps are known and used in industry to trap steam in pressurized systems. A steam trap is operatively connected in-line to a pressurized system and close when a predetermined temperature is reached. A spring-loaded mechanism in the steam trap moves a valve between an opened configuration and a closed configuration over a range of pressure. The threshold between the opened configuration and the closed configuration follows a saturated steam curve.

Steam traps commonly use bimetallic strips packed together into stack elements which create a force on the valve that is driven by temperature of the pressurized system. These stack elements are combined in such a way that the force increases gradually with rising temperature. The steam trap assembly has a significant size and is generally heavy.

It is believed needs exist for improvements in steam traps, including steam traps having reduced size and weight over conventional steam traps; steam traps that more closely follow saturated steam curves of pressurize systems when compared to conventional steam traps; and steam traps having designs that can be more economically manufactured than conventional steam traps. One or more such needs are believed to be met by one or more embodiments of the present invention.

SUMMARY OF THE INVENTION

The present invention includes many aspects and features.

Accordingly, in an aspect of the present invention, a thermostatic steam trap includes a lower casing; an upper casing secured with the lower casing; and a mechanism that is operatively secured with the lower casing and the upper casing and that includes a stack of bimetallic strips. The stack of bimetallic strips includes two opposed cantilevered portions separated by a bimetallic strips-securing axis, which can also be referred to a neutral flexion axis since the series of bimetallic plates is assembled, secured and prevented from flexing along this bimetallic strips-securing axis. A stem member slidably extends through the stack of bimetallic strips and the lower casing, and a valve portion includes a valve member that is operatively secured to a first end of the stem member and that selectively closes the valve portion with movement of the cantilevered portions of the stack of bimetallic strips.

In another aspect of the present invention, a thermostatic steam trap comprises a lower casing; an upper casing secured with the lower casing; a valve; and means for closing the valve as a result of an increasing temperature of the thermostatic steam trap.

An aspect of one or more embodiments of the invention provides a steam trap valve including a combination of a spring mechanism and a strips mechanism, the spring mechanism being adapted to operate at a lower pressure than the strip mechanism.

An aspect of one or more embodiments of the invention provides a steam trap including a two-stage force transfer of which the first stage is achieved by assistance of a spring in order to transfer a reduced amount of force at a lower operating pressure range and the second stage is provided by direct bimetal strips force transfer.

One aspect of the invention provides a steam trap including two or more spring rates which cause the amount of valve closing force.

An aspect of one or more embodiments of the invention provides a steam trap valve including an adjustable spring mechanism pretension that is keeping the steam valve closed when the strip mechanism is not applying tension to close the valve.

An aspect of one or more embodiments of the invention provides a steam trap with a spring mechanism including a bush therein to limit the travel of the stem member against the bimetallic spring of the first spring mechanism.

An aspect of one or more embodiments of the invention provides a steam trap that is using bimetallic plates therein with locating pins engaging the bimetallic plates therein along a middle portion thereof.

An aspect of one or more embodiments of the invention provides a steam trap valve using a bridge portion to transfer a force from the bimetallic plates of the strip mechanism to the valve portion.

Accordingly, it is believed that one or more embodiments of the invention provide an improved steam trap over the prior art.

Various features of the present invention include: a steam trap that has reduced size compared to an equivalent prior art steam trap; a steam trap comprises a symmetrical steam trap valve; a steam trap that comprises double trapezoidal bimetallic plates; a steam trap that comprises bimetallic plates that are not welded to a casing; a steam trap that comprises a combination of a spring mechanism and a strip mechanism, wherein the spring mechanism is adapted to operate at a lower pressure than the strip mechanism; a steam trap that comprises a two-stage force transfer, of which the first stage is achieved by assistance of a spring in order to transfer a reduced amount of force at a lower operating pressure range, and the second stage is provided by direct bimetal strips force transfer; a steam trap that comprises two or more spring rates contributing to the valve closing force; a steam trap that comprises an adjustable spring-mechanism pretension that keeps the steam valve closed when the strip mechanism does not apply tension to close the valve; a steam trap that comprises a spring mechanism including a bushing therein that limits the travel of a stem member against the bimetallic spring of the spring mechanism; a steam trap that uses bimetallic plates therein with locating pins engaging the bimetallic plates therein along a middle portion thereof; and a steam trap using a bridge portion to transfer a force from the bimetallic plates of the strip mechanism to the valve portion.

In addition to the aforementioned aspects and features of the present invention, it should be noted that the present invention further encompasses the various logical combinations and subcombinations of such aspects and features.

Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the present invention now will be described in detail with reference to the accompanying drawings, wherein the same elements are referred to with the same reference numerals, and wherein.

DETAILED DESCRIPTION

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention, and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention is to be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the applicable Laws and Rules, no claim element is to be interpreted as a "means plus function" unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once during performance of the claimed method.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." When used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring the drawings, one or more preferred embodiments of the invention are next described. The following description of one or more preferred embodiments is merely exemplary in nature and is in no way intended to limit the invention, its implementations, or uses.

Figure 1:
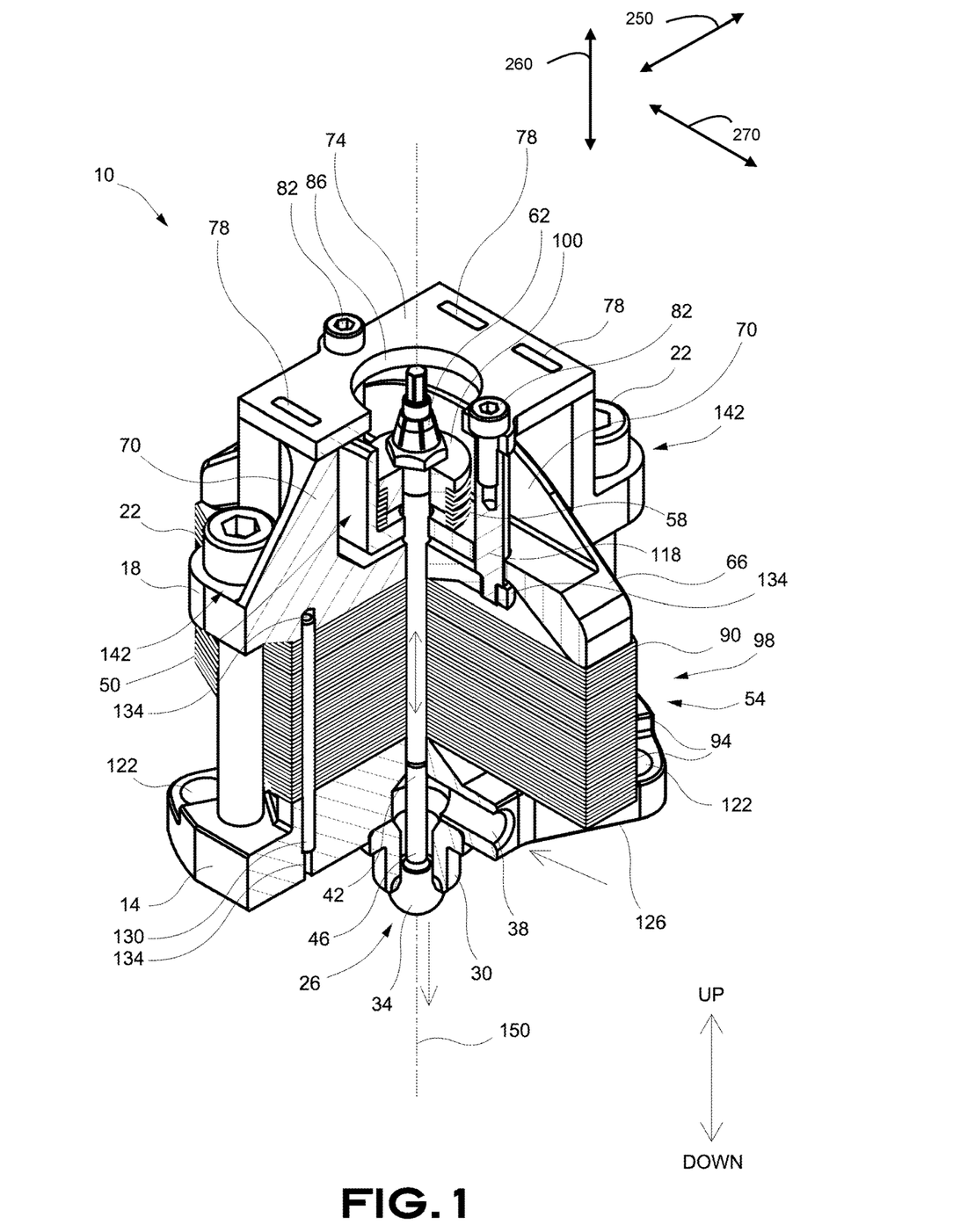
FIG. 1 illustrates an isometric view, in partial cross-section, of a steam trap in accordance with one or more embodiments of the invention.

Turning now to FIG. 1, a preferred embodiment of a steam trap is described in accordance with one or more aspects and features of the present invention. The steam trap 10 includes a lower casing 14 and an upper casing 18 interconnected with a plurality of fasteners 22. The lower casing 14 houses a valve portion 26 including a valve seat 30 sized and designed to mate with a closing valve member 34 configured to selectively close the valve portion 26 and to prevent steam from a steam inlet 38 from passing through the valve portion 26. For added clarity, reference directions are indicated in the figures with a longitudinal direction illustrated with arrow 270, a lateral direction illustrated with arrow 250 and a vertical direction illustrated with arrow 260.

The valve member 34 is secured to a stem member 42 at a first end 46 thereof. The stem member 42 is axially movable along axis 150 through the lower casing 14 and the upper casing 18 to open, or close, the valve portion 26 upon application of tension from a spring mechanism 50 and a strips mechanism 54 that reacts to heat variations.

The spring mechanism 50 applies a force on the valve member 34 that is proportional to the spring rate and pretension of springs 58 once valve member 34 is closed. The strips mechanism 54 is reacting to temperature and is lifting a bridge portion 66 to actuate the valve portion 26. The strips mechanism 54 is also enabling the spring mechanism 50 force on the valve member 34 when the springs 58 are getting compressed. The result of both the spring mechanism 50 and the strips mechanism 54 on the valve member 34 is going to be discussed in greater details below.

The spring mechanism 50 includes a single or a series of superposed springs 58 stacked one on top of the other and secured in place with a bushing 100 and a fastener 62 securing the assembly. Optional preloading of the spring mechanism 50 is achieved by tightening or releasing the fastener 62, as desired. It is generally desirable that the valve be in an open position at room temperature. The spring mechanism 50 thus is assembled loose in order to provide a gap for free movement between the bushing 100 and the fastener 62. The fastener 62 can be used to adjust the temperature at which the spring mechanism 50 comes into action, transferring a portion of the spring force to the valve member 34, due to the pressure exercised on the bridge 66 by the superposed springs 58. It can be appreciated the series of superposed springs 58 are restricted on the upper side with the bushing 100 and on the opposite side by a bridge portion 66.

Figure 2:
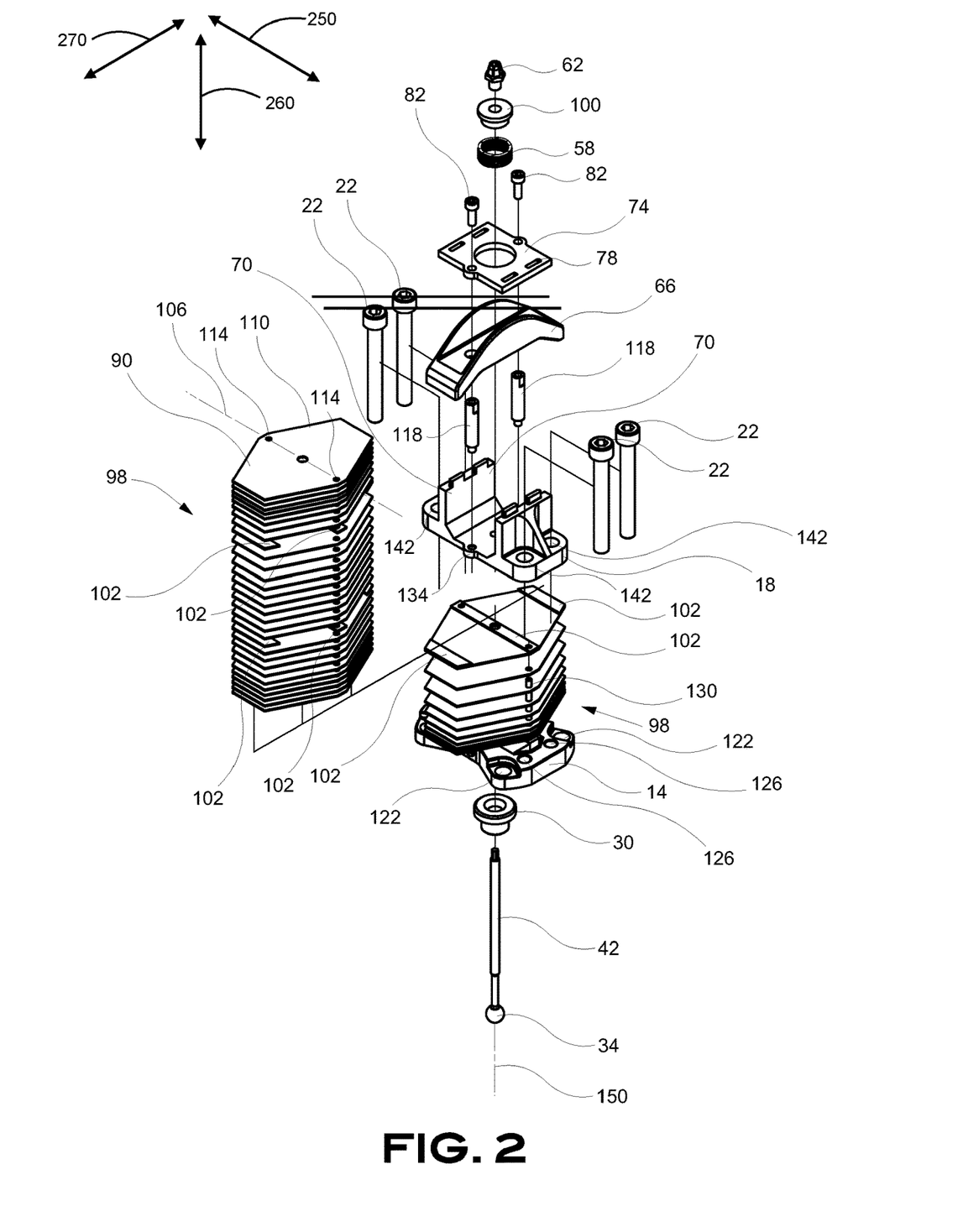
FIG. 2 illustrates an isometric exploded view of the steam trap of FIG. 1.

It can be further appreciated from FIG. 2 that the bushing 100 locates and centers the superposed springs 58 of the spring mechanism 50 to ensure proper alignment and equal contact between the parts. The axial length of the bushing 100 is sized to limit the compression of the superposed springs 58 when the strips mechanism 54 is actuated and pulls the stem member 42 by lifting the bridge 66 to abut the bushing 100 on the bridge 66 and apply only the force from the strips mechanism 54 on the stem member 42.

The upper casing 18 is also used to enclose and protect the spring mechanism 50 with elongated portions 70 to which is engaged a cover plate 74. The elongated portions 70 engage corresponding openings 78 in the cover plate 74 and fasteners 82 further secure the cover plate 74 to connector rods 118. The connector rods 118 primarily ensure the alignment of the bridge 66. Adjustment of the fastener 62 can be made through an opening 86 in the cover plate 74.

In a first stage, no pulling on the stem member 42 is provided by the spring mechanism 50 and the strips mechanism 54 before a first predetermined temperature 160 is reached. The series of superposed springs 58 of the spring mechanism 50 are set to begin to longitudinally pull the stem member 42 in the closed configuration in a second stage when the first predetermined temperature 160 is reached with the combined effect of the strips mechanism 54 lifting the bridge 66 to compress the superposed springs 58 in consequence of the temperature increase. This pulls the stem member 42 upward to close the valve portion 26 by transmitting the tension generated by the series of superposed springs 58 to the bridge portion 66 contacting in the opposed direction the distal ends of the bimetallic plates 90 of the strips mechanism 54. The strips mechanism 54 is embodied with a series of bimetallic plates strips 90 that lift the bridge portion 66 when temperature rises to compress the spring mechanism 50, abuts the upper bushing 100 when a second predetermined temperature 164 is reached, and closes the valve portion 26 with more strength at stage three. The series of bimetallic strips plates 90 acts as a double cantilevered mechanism, as embodied, with a first cantilevered portion extending on a first lateral side from the bimetallic strips-securing axis 106 and a second cantilevered portion extending on a second lateral side from the bimetallic strips-securing axis 106. The series of double cantilevered bimetallic strips 90 being adapted to provide a force proportional to the spring rate of the series of bimetallic strips 90 for closing the valve portion 26 when a predetermined temperature is reached. The primary function of the series of bimetallic strips 90 is to bend upwards with rising temperature and produce a force due to its restricted displacement when the valve reaches the closed position.

The stack of bimetallic strips 90 includes intervening spaces 94 distributed in the stack 98 to reduce friction and increase responsiveness in movements of the bimetallic strips 90. Spacers 102 are added in the spaces 94 to ensure contact between adjacent bimetallic strips 90 to transmit movements of all the bimetallic strips 90 collectively. It can be appreciated a single series of bimetallic strips 90 is illustrated; however, a plurality of spaced apart series of bimetallic strips reacting differently to temperature variations can be used to achieve different valve closing behaviors.

The shape of the bimetallic strips 90 is preferably symmetrical on both sides of bimetallic strips-securing axis 106 and is embodied as a trapezoidal shape 110. The stack 98 of bimetallic strips 90 is secured with pins 130 along the bimetallic strips-securing axis 106 through openings 114 performed in each bimetallic strips 90. The openings 114 can be slightly offset in a way that bimetallic plates 90 can only be installed in one direction, the correct operating position, to deflect in the desired direction. The stack 98 of bimetallic strips 90 is hence symmetrically secured in a two cantilevers configuration between the lower casing 14 and the upper casing 18. Supporting the bimetallic strips 90 along the bimetallic strips-securing axis 106 prevents, inter alia, any bending of the casing since equivalent forces are generated on both sides as opposed to a simple assembly of cantilever bimetallic strips 90 that would generate a force on a single side and apply a moment on the assembly that would have to sustain greater mechanical stresses. Each of the bimetallic strips 90 includes an opening 138 along the bimetallic strips-securing axis 106 and preferably centered along the bimetallic strips-securing axis 106 to receive therein the stem member 42 that can be axially inserted through the stacked plurality of bimetallic strips 90 in a slide fit arrangement. The openings 114 and the openings 138 are located along the bimetallic strips-securing axis 106 of the symmetrical double-cantilevered stacked of bimetallic plates 90 and are hence not weakening the bimetallic strips 90 and affecting the elastic deformation behavior of the bimetallic strips 90 upon temperature change.

Still referring to FIGS. 1 and 2, the lower casing 14 includes a plurality of mounting openings 122 and a substantially planar lower securing surface 128. The lower casing 14 further includes a plurality of fasteners-securing holes 126. Similarly, the upper casing 18 includes a plurality of fastener-receiving holes 142 and a pair of connector rods-receiving holes 134.

Figure 3:
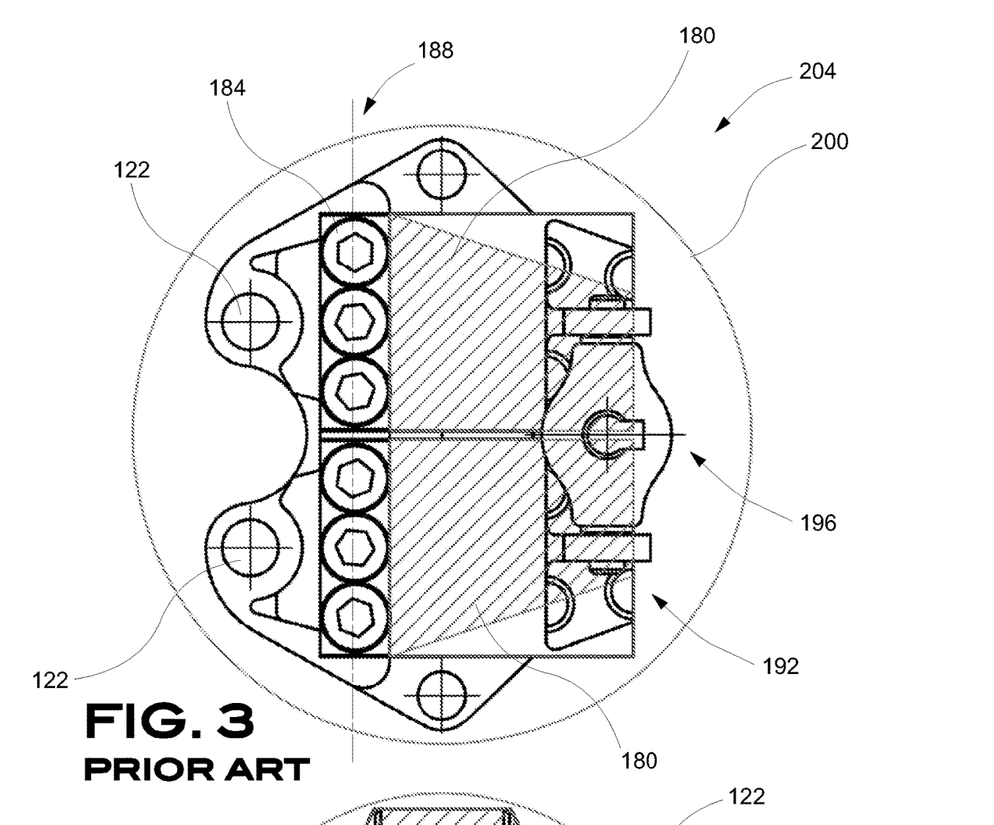
FIG. 3 illustrates a top plan view of a single-cantilever valve design of the prior art.
Figure 4:
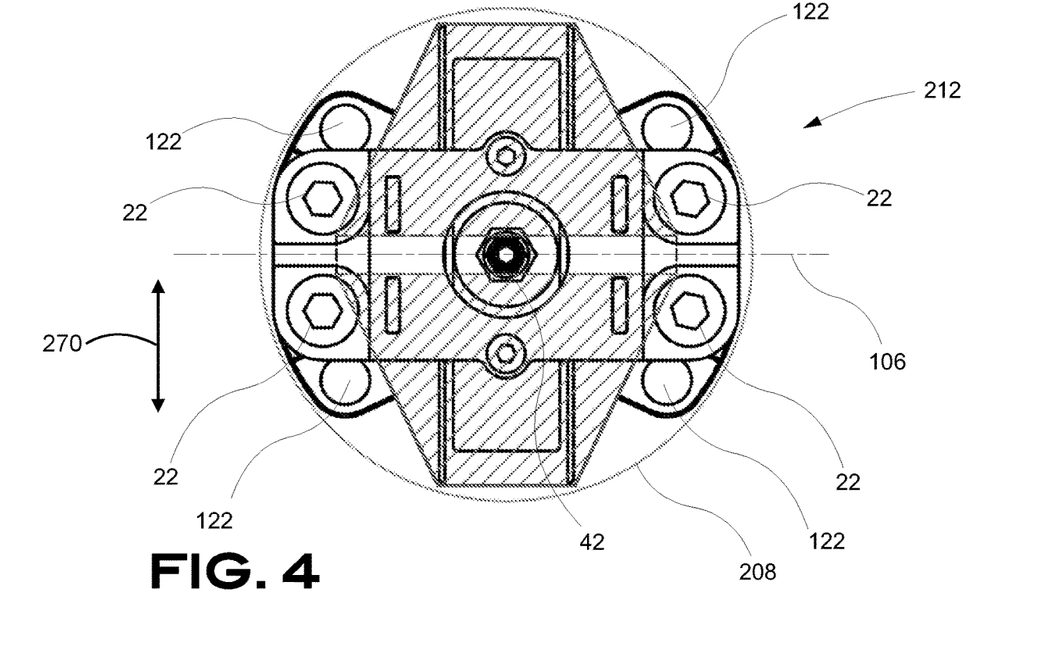
FIG. 4 illustrates is a top plan view of a double-cantilever valve design in accordance with one or more embodiments of the present invention.

Referring now to FIG. 3 illustrating a prior art single-cantilever configuration of bimetallic strips 180, it will be seen that the bimetallic strips 180 are secured with a plurality of fasteners 184 along a first side 188 of the bimetallic strips 180. The cantilever end 192 of the bimetallic strips 180 is operatively secured to the valve portion 196 via the bridge 66 and bushing 100. It can be appreciated the outside diameter 200 of such a single-cantilever design 204 requires a larger overall diameter 200 compared to the overall diameter 208 of the symmetrical double-cantilever design 212 illustrated in FIG. 4. The present embodiment shows the double-cantilever design 212 is about 80% of the diameter of the single-cantilever design 204 while providing comparable valve actuation force. The double-cantilever design 212 uses less waste area of the bimetallic strips as opposed to the single cantilever design 204 as illustrated in FIG. 3. Additionally, the double cantilever design 212 requires less strength than the simple cantilever design 204 to hold tension and sustain the moment created by bending stack of strips; the resulting opposed moments of the double cantilever design 212 are canceling each other. Another advantage of the double cantilever design 212 is that the stem member 42 pulls in a linear alignment as a result of the spring mechanism 50 and the strips mechanism 54 because of the symmetrical geometry of the assembly and the use of the bridge to transfer the force equally on both sides of the bridge. In contrast, a single cantilever design 204 pulls the stem member 42 of the valve 10 along a radius of the single-cantilever bimetallic spring bending pattern.

Figure 5:
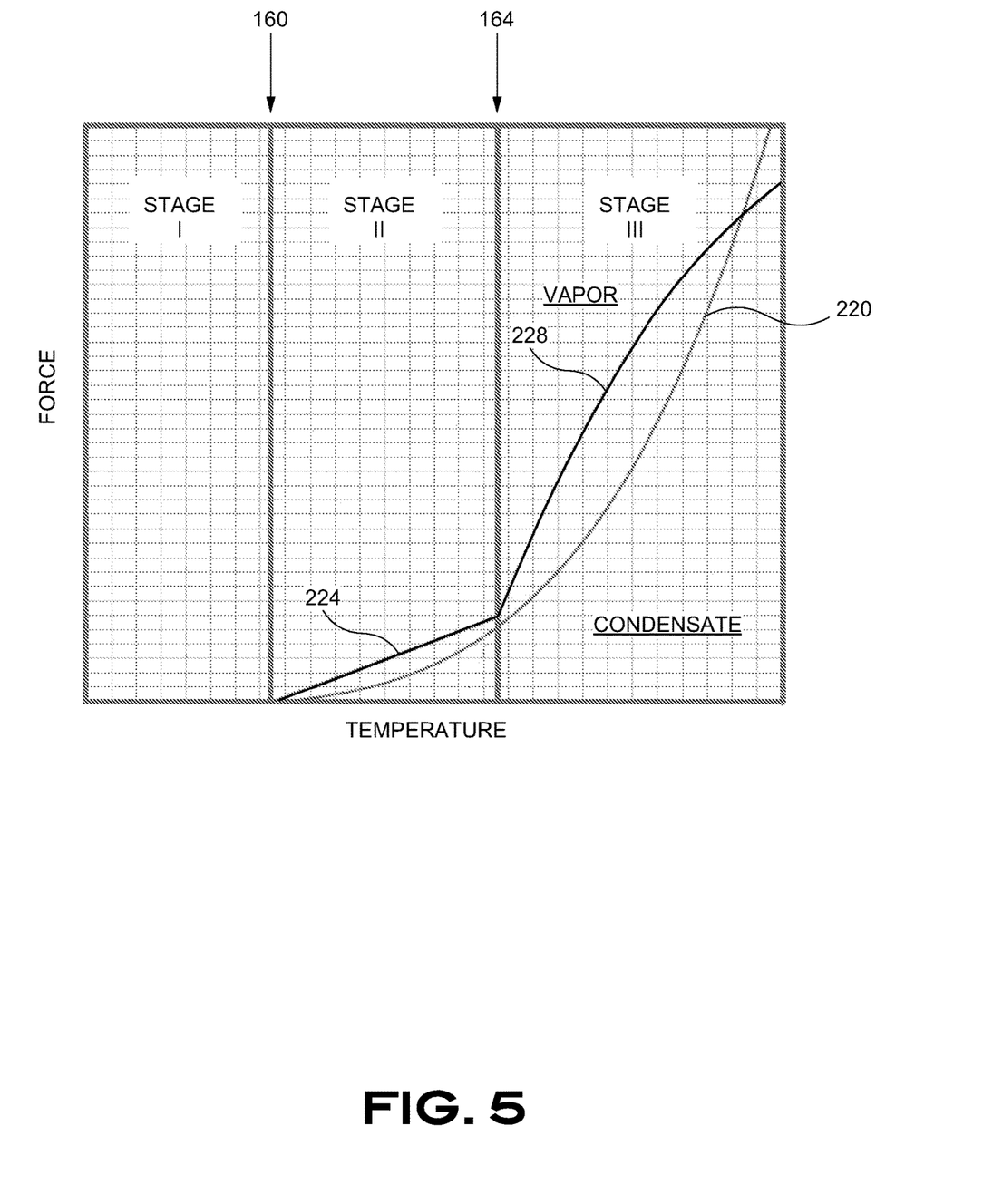
FIG. 5 illustrates a schematic graph of a typical vapor-condensate curve compared to a closing behavior of a steam trap in accordance with one or more embodiments of the present invention.

A saturated steam graph is illustrated in FIG. 5. The saturated steam curve 220 is depicted with "steam trap valve force" on the Y axis. Temperature graph with a stage II curve 224 represents the effect of the spring mechanism 50 force on the valve member 34. Temperature graph with a stage III curve 228 represents the effect of the strips mechanism 54 force on the valve member 34 closure.

In stage I, the steam trap valve 10 is open. One can appreciate the steam trap 10 can collect a bit of condensate while the forces between the spring mechanism 50 and the strips mechanism 54 are in equilibrium. The internal pressure of the pressurized system increases with temperature. In other words, the higher the pressure, the higher the condensation temperature. In stage II, the combined effect of the spring mechanism 50 and the strips mechanism 54, before abutment of the bushing 100 on the bridge 66 occurs, allows to extract almost only condensate at low temperature. The spring rate of the spring mechanism 50 and the spring rate of the strips mechanism 54 are generally taken into account for the resulting closing force of the steam trap 10. In stage III, the bushing 100 abuts the bridge 66 and complete force of the strips mechanism 54 closes the valve to follow the more abrupt vapor-condensate curve at higher temperature to purge a minimum of vapor from the pressurized system.

Figure 6:
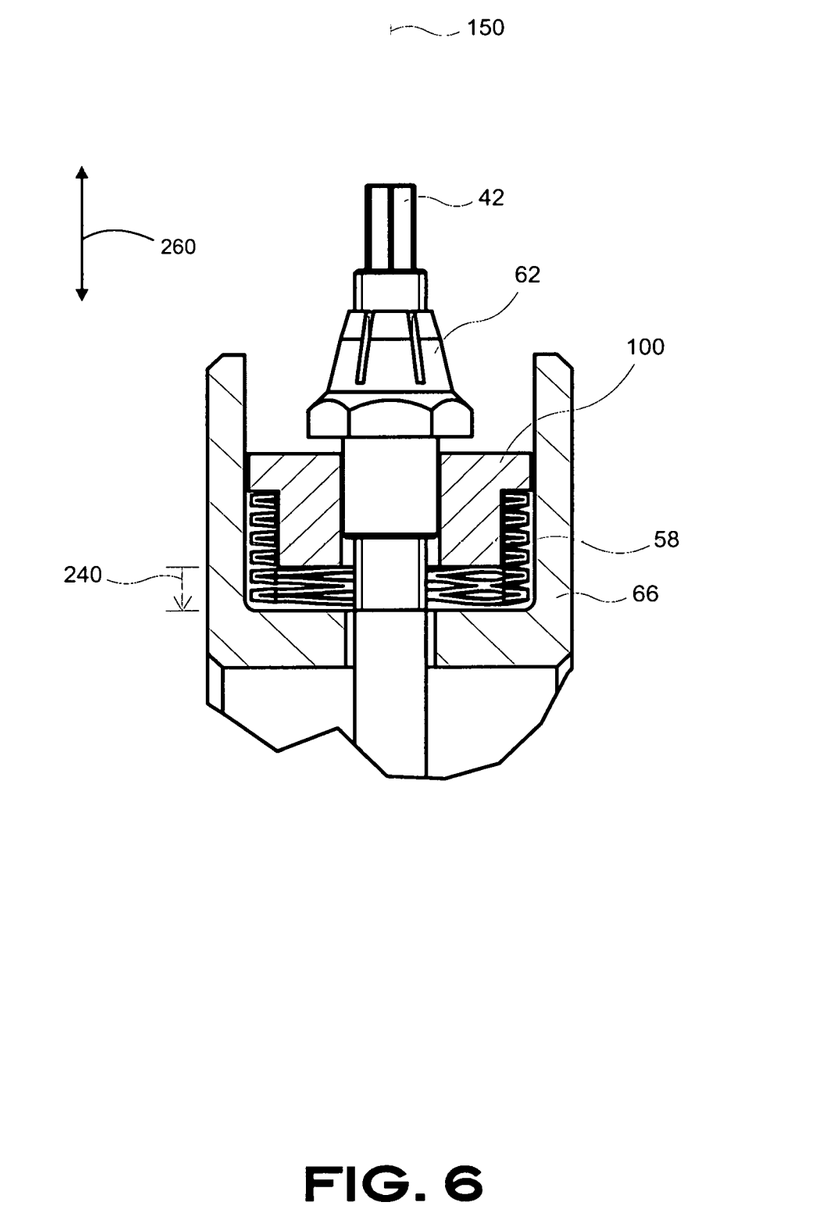
FIG. 6 illustrates a side elevational view in cross-section of a portion of a spring mechanism of the steam trap of FIG. 1.
Figure 7:
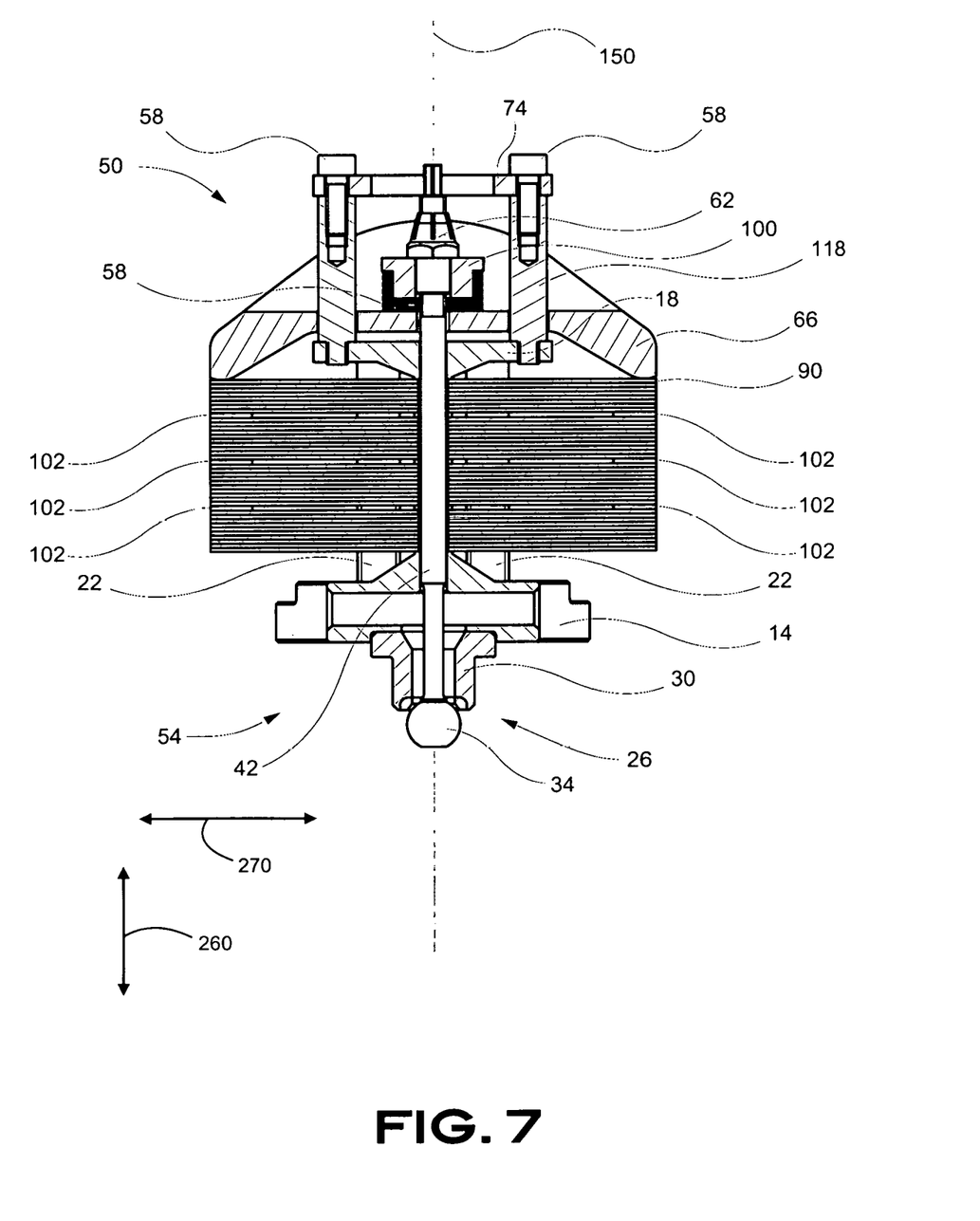
FIG. 7 illustrates a side elevational view in cross-section of a portion of the steam trap of FIG. 1.
Figure 8:
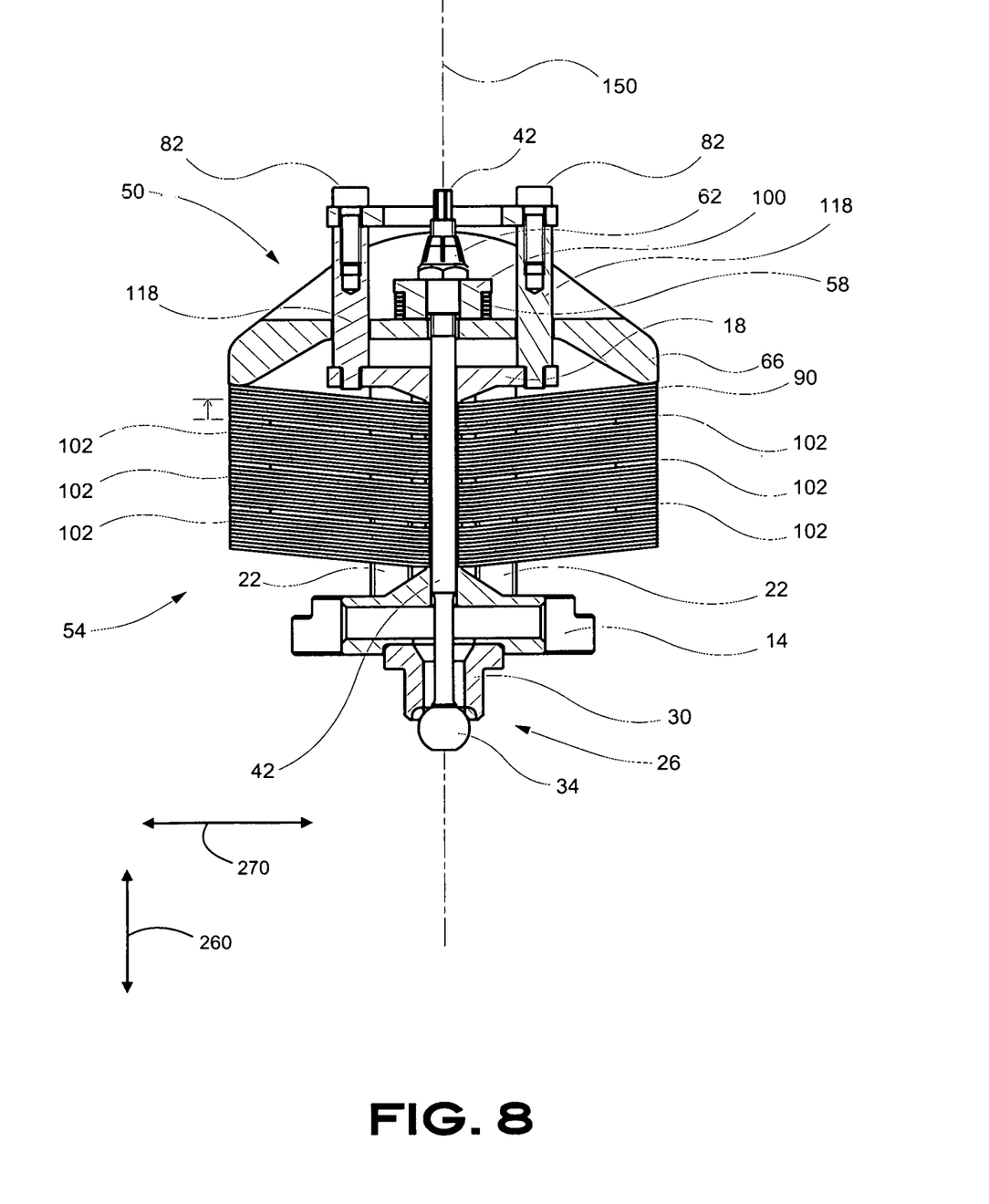
FIG. 8 illustrates another side elevational view in cross-section of a portion of the steam trap of FIG. 1.

FIG. 6 is a magnified view of the spring mechanism 50 at stage I, wherein the spring 58 is uncompressed. The displacement 240 of the bushing 100 is indicated in FIG. 6. In turn, FIG. 7 illustrates the steam trap 10 at stage I with the valve portion 26 in an open state to allow condensate to be extracted from the valve portion 26. FIG. 8 illustrates the steam trap at stage III in a closed state, wherein the bushing 100 of the spring mechanism 50 abuts the bridge portion 66 and closes the valve portion 26 to prevent any extraction from the valve portion 26 in contract with the embodiment illustrated in FIG. 7.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A thermostatic steam trap comprising:
an upper casing;
a lower casing secured with the upper casing;
a plurality of bimetallic strips superposed one on top of the other in a vertical stack of bimetallic strips, each bimetallic strip including
a planar surface;
a center portion longitudinally located about a middle portion of the planar surface and aligned in a lateral direction, the center portion separating the planar surface in two longitudinally opposed bendable portions;
a first bendable portion disposed on a first longitudinal side of the center portion, a distal portion of the first bendable portion being vertically movable between an unbent configuration and a bent configuration when the bimetallic strip is responding to temperature; and
a second bendable portion disposed on a second longitudinal side of the center portion, a distal portion of the second bendable portion being vertically movable between an unbent configuration and a bent configuration when the bimetallic strip is responding to temperature,
the center portion of each of the bimetallic strips being secured in parallel with each other secured between the upper casing and the lower casing in the vertical stack of bimetallic strips, the upper casing and the lower casing preventing the central portion of each of the bimetallic strips from bending in the lateral direction along an entire lateral length of the bimetallic strips when the first bendable portions and the second bendable portions of the stack of bimetallic strips are moving as a group;
a bridge vertically superposed to the stack of bimetallic strips, the bridge including a pair of strip-contacting portions respectively positioned in vertical superposition to the distal portions of the first and second bendable portions, the bridge being adapted to move in a vertical direction in response to vertical movement of the distal portions of the first and second bendable portions;
a stem member orthogonally positioned about the stack of bimetallic plates, the stem member freely extending through center portion of the stack of bimetallic plates, the upper casing and the lower casing to allow vertical movements of the stem member, a first end of the stem member being vertically actuated by the bridge in response to vertical movements of the distal portions of the first and second bendable portions; and a valve portion adjacent to the lower casing, in vertical alignment with the stem member, the valve portion being operatively connected to a second end of the stem member to close a steam inlet upon increase in temperature of the plurality of bimetallic strips, whereby the plurality of the bimetallic strips remain immovable along the central portion upon temperature variations and actuation of the valve portion is provided by the movements of the distal portions of the first bendable portion and the second bendable portion.

2. The thermostatic steam trap of claim 1, wherein the upper casing and the lower casing are removably secured together with at least two fasteners.

3. The thermostatic steam trap of claim 2, wherein each of the bimetallic strips is vertically aligned with at least one locating pin vertically inserted through the center portion of the stack of bimetallic strips.

4. The thermostatic steam trap of claim 3, wherein the two fasteners and the at least one pin are longitudinally and laterally aligned with the central portion.

5. The thermostatic steam trap of claim 1, wherein the bridge is aligned with connector rods.

6. The thermostatic steam trap of claim 1, wherein each of the bimetallic strips includes a trapezoidal shape.

7. The thermostatic steam trap of claim 1, further comprising at least one spacer disposed between at least two adjacent bimetallic strips.

8. The thermostatic steam trap of claim 1, further comprising a spring mechanism operatively connected between the bridge and the first end of the stem member for biasing the bridge against the first end of the stem member.

9. The thermostatic steam trap of claim 8, wherein vertical movement of the distal portions of the first and second bendable portions to close the valve portion is compressing the spring mechanism with a first amount of force required to compress the spring mechanism, and to close the valve portion with a second amount of force when compression of the spring mechanism is completed.

10. The thermostatic steam trap of claim 9, wherein the spring mechanism further comprises a bushing for vertically limiting the vertical compression of the spring mechanism.

11. The thermostatic steam trap of claim 8, wherein the spring mechanism includes a plurality of biasing members.

12. The thermostatic steam trap of claim 8, wherein the stem member includes a fastener for setting a pretension of the spring mechanism.

13. The thermostatic steam trap of claim 1, wherein the valve portion comprises a valve seat.

14. A thermostatic steam trap kit comprising:
an upper casing;
a lower casing sized and designed to be secured to the upper casing;
a plurality of bimetallic strips configured to be superposed one on top of the other in a vertical stack of bimetallic strips, each bimetallic strip including
  a planar surface;
  a center portion longitudinally located about a middle portion of the planar surface and aligned in a lateral direction, the center portion separating the planar surface in two longitudinally opposed bendable portions;
  a first bendable portion disposed on a first longitudinal side of the center portion, a distal portion of the first bendable portion being vertically movable between an unbent configuration and a bent configuration when the bimetallic strip is responding to temperature; and
  a second bendable portion disposed on a second longitudinal side of the center portion, a distal portion of the second bendable portion being vertically movable between an unbent configuration and a bent configuration when the bimetallic strip is responding to temperature,
the center portion of each of the bimetallic strips being adapted to be secured in parallel with each other secured between the upper casing and the lower casing in the vertical stack of bimetallic strips, the upper casing and the lower casing preventing the central portion of each of the bimetallic strips from bending in the lateral direction along an entire lateral length of the bimetallic strips when the first bendable portions and the second bendable portions of the stack of bimetallic strips are moving as a group;
a bridge adapted to be vertically superposed to the stack of bimetallic strips, the bridge including a pair of strip-contacting portions for being respectively positioned, when assembled, in vertical superposition to the distal portions of the first and second bendable portions, the bridge being adapted to move in a vertical direction in response to vertical movement of the distal portions of the first and second bendable portions;
a stem member configured to be orthogonally positioned about the stack of bimetallic plates, the stem member freely extending, when assembled, through center portion of the stack of bimetallic plates, the upper casing and the lower casing to allow vertical movements of the stem member, a first end of the stem member being vertically actuated by the bridge in response to vertical movements of the distal portions of the first and second bendable portions when operatively assembled; and
a valve portion sized and designed to be disposed adjacent to the lower casing, in vertical alignment with the stem member, the valve portion being operatively connectable to a second end of the stem member to close a steam inlet upon increase in temperature of the plurality of bimetallic strips once assembled, whereby the plurality of the bimetallic strips would remain immovable along the central portion upon temperature variations and actuation of the valve portion would be provided by the movements of the distal portions of the first bendable portion and the second bendable portion.

15. The thermostatic steam trap kit of claim 14, further comprising at least two fasteners for removably securing the upper casing and the lower casing.

16. The thermostatic steam trap kit of claim 14, further comprising at least one locating pin for vertically aligning each of the bimetallic strips when the at least one locating pin is vertically inserted through the center portion of the stack of bimetallic strips.

17. The thermostatic steam trap kit of claim 14, wherein each of the bimetallic strips includes a trapezoidal shape.

18. The thermostatic steam trap kit of claim 14, further comprising at least one spacer to be disposed between at least two adjacent bimetallic strips.

19. The thermostatic steam trap kit of claim 14, further comprising a spring to be operatively connected between the bridge and the first end of the stem member for biasing the bridge against the first end of the stem member.

20. The thermostatic steam trap kit of claim 19, wherein, once operatively assembled, a vertical movement of the distal portions of the first and second bendable portions to close the valve portion is compressing the spring mechanism with a first amount of force required to compress the spring, and to close the valve portion with a second amount of force when compression of the spring is completed.

\* \* \* \* \*